(12) United States Patent
Kalous

(10) Patent No.: US 8,028,551 B2
(45) Date of Patent: Oct. 4, 2011

(54) SECURE MOUNTING ARRANGEMENTS FOR A LOCK ASSEMBLY

(75) Inventor: D. Scott Kalous, Kenosha, WI (US)

(73) Assignee: Master Lock Company LLC, Oak Creek, WI (US)

( * ) Notice: Subject to any disclaimer, the term of this patent is extended or adjusted under 35 U.S.C. 154(b) by 396 days.

(21) Appl. No.: 12/132,906

(22) Filed: Jun. 4, 2008

(65) Prior Publication Data

US 2009/0007614 A1    Jan. 8, 2009

Related U.S. Application Data

(60) Provisional application No. 60/941,871, filed on Jun. 4, 2007, provisional application No. 60/982,525, filed on Oct. 25, 2007.

(51) Int. Cl.
*E05B 67/24* (2006.01)

(52) U.S. Cl. ............ 70/38 B; 70/51; 70/52; 70/232; 70/234; 70/DIG. 57; 410/106

(58) Field of Classification Search .......... 70/38 B, 70/52, 232, DIG. 57, 19, 20, 31, 38 R, 39, 70/51, 234, 451, 370–372, 14, 18, 58, 229, 70/230; 109/50–52; 410/102, 106, 107, 410/111, 112
See application file for complete search history.

(56) References Cited

U.S. PATENT DOCUMENTS

| | | | | |
|---|---|---|---|---|
| 1,228,123 A | * | 5/1917 | McDermott | 70/200 |
| 1,929,235 A | * | 10/1933 | Bevington | 70/38 B |
| 2,813,417 A | * | 11/1957 | Kielland | 70/45 |
| 3,176,487 A | | 4/1965 | Dauenbaugh | |
| 3,422,643 A | * | 1/1969 | Foote | 70/38 B |
| 3,605,458 A | * | 9/1971 | Best | 70/49 |
| 3,649,072 A | | 3/1972 | Cross | |
| 3,765,197 A | * | 10/1973 | Foote | 70/58 |
| 3,832,871 A | * | 9/1974 | Kaufmann | 70/227 |
| 3,835,675 A | * | 9/1974 | Lippisch | 70/38 A |
| 4,055,060 A | * | 10/1977 | Bellino | 70/234 |
| 4,055,973 A | * | 11/1977 | Best | 70/58 |
| 4,079,604 A | | 3/1978 | Anderegg | |
| 4,094,173 A | * | 6/1978 | Brown | 70/237 |
| 4,210,361 A | | 7/1980 | Marvin et al. | |
| 4,252,362 A | | 2/1981 | Campbell | |

(Continued)

FOREIGN PATENT DOCUMENTS

CN   2417257 Y   1/2001

(Continued)

*Primary Examiner* — Lloyd Gall
(74) *Attorney, Agent, or Firm* — Calfee, Halter & Griswold LLP

(57) ABSTRACT

A mountable lock includes a lock body and a retaining member. The lock body is configured to be secured to an external structure by at least one fastening member. The lock body includes a lock interface movable from a locking condition to an unlocking condition in response to proper user manipulation of the lock interface. The retaining member includes a first end receivable in a first opening of the lock body and lockingly engageable with the lock body when the lock interface is in the locking condition, the first end being disengageable from the first opening when the lock interface is in the unlocking condition. The at least one fastening member is accessible through a passageway in the lock body that is blocked when the retaining member is in locking engagement with the lock body, thereby preventing disassembly of the lock body from the external structure.

18 Claims, 12 Drawing Sheets

U.S. PATENT DOCUMENTS

| | | | |
|---|---|---|---|
| 4,273,377 A | 6/1981 | Alexander | |
| 4,290,280 A * | 9/1981 | Yun | 70/38 A |
| 4,404,825 A * | 9/1983 | Dixon et al. | 70/368 |
| 4,419,873 A * | 12/1983 | Sopko | 70/38 A |
| 4,518,194 A | 5/1985 | Kirkham et al. | |
| 4,547,014 A | 10/1985 | Wicker | |
| 4,563,034 A | 1/1986 | Lamb | |
| 4,611,848 A | 9/1986 | Romano | |
| 4,650,383 A | 3/1987 | Hoff | |
| 4,658,606 A * | 4/1987 | Tseng | 70/38 A |
| 4,717,196 A | 1/1988 | Adams | |
| 4,747,441 A | 5/1988 | Apolzer et al. | |
| 4,770,579 A | 9/1988 | Aksamit | |
| 4,772,165 A | 9/1988 | Bartkus | |
| 4,776,629 A | 10/1988 | Cross | |
| 4,784,427 A | 11/1988 | Burgess | |
| 4,786,099 A | 11/1988 | Mount | |
| 4,792,178 A | 12/1988 | Kokx | |
| 4,795,206 A | 1/1989 | Adams | |
| 4,807,921 A | 2/1989 | Champie, III et al. | |
| 4,811,578 A * | 3/1989 | Masoncup et al. | 70/38 B |
| 4,889,381 A | 12/1989 | Tamblyn et al. | |
| 4,932,704 A | 6/1990 | Ament | |
| 5,040,843 A | 8/1991 | Russell et al. | |
| 5,082,404 A | 1/1992 | Stewart et al. | |
| 5,096,250 A | 3/1992 | Menz | |
| 5,152,160 A | 10/1992 | Lentini | |
| 5,174,136 A * | 12/1992 | Thwing | 70/38 A |
| 5,251,950 A | 10/1993 | Bernardo | |
| 5,257,840 A | 11/1993 | Rouzaud | |
| 5,273,382 A | 12/1993 | Yearick | |
| 5,330,246 A | 7/1994 | Bernardo | |
| 5,350,213 A | 9/1994 | Bernardo | |
| 5,377,511 A * | 1/1995 | Meckbach | 70/38 A |
| 5,394,711 A * | 3/1995 | Pitkanen | 70/38 A |
| 5,572,890 A * | 11/1996 | Carpenter | 70/371 |
| 5,768,920 A | 6/1998 | DeBevoise | |
| 5,794,463 A * | 8/1998 | McDaid | 70/18 |
| 5,823,725 A | 10/1998 | Goodwin | |
| 5,870,911 A | 2/1999 | DeWalch | |
| 5,896,761 A * | 4/1999 | Chen | 70/38 A |
| 5,971,685 A | 10/1999 | Owens | |
| 5,975,819 A | 11/1999 | Cola | |
| 5,987,940 A * | 11/1999 | Chang | 70/38 A |
| 6,000,744 A | 12/1999 | Kooiker | |
| 6,030,021 A | 2/2000 | Ronai | |
| 6,042,312 A | 3/2000 | Durham, II | |
| 6,059,350 A | 5/2000 | Kooiker | |
| 6,077,007 A | 6/2000 | Porter et al. | |
| 6,095,588 A | 8/2000 | Rodosta | |
| 6,113,176 A | 9/2000 | Bernardo | |
| 6,176,541 B1 | 1/2001 | Hoff | |
| 6,224,138 B1 | 5/2001 | Adsit et al. | |
| 6,276,735 B1 | 8/2001 | Champion | |
| 6,321,819 B1 | 11/2001 | Copp et al. | |
| 6,349,575 B1 | 2/2002 | Bentley | |
| 6,511,272 B2 | 1/2003 | Stafford | |
| 6,568,732 B2 | 5/2003 | De Gaillard | |
| 6,679,379 B1 | 1/2004 | Kao | |
| 6,694,781 B1 * | 2/2004 | Li | 70/14 |
| 6,732,984 B2 | 5/2004 | Tsai | |
| 6,846,032 B2 | 1/2005 | de Gaillard et al. | |
| 6,866,454 B2 | 3/2005 | White | |
| 6,893,072 B1 | 5/2005 | Graves | |
| 6,948,760 B2 | 9/2005 | Marx et al. | |
| 7,004,530 B2 | 2/2006 | Marx et al. | |
| 7,246,511 B1 * | 7/2007 | Zhu | 70/38 R |
| 7,389,659 B1 * | 6/2008 | Diaz et al. | 70/38 A |
| 7,614,264 B2 * | 11/2009 | Mc Gettrick | 70/14 |
| 7,823,424 B2 * | 11/2010 | Shabtay et al. | 70/38 A |
| 2003/0230909 A1 | 12/2003 | Melius et al. | |
| 2004/0134953 A1 | 7/2004 | Perez | |
| 2005/0254918 A1 | 11/2005 | Smits | |
| 2007/0107476 A1 * | 5/2007 | Ruan | 70/38 A |
| 2007/0204664 A1 * | 9/2007 | Tang | 70/38 A |

FOREIGN PATENT DOCUMENTS

JP 05124471 5/1993

* cited by examiner

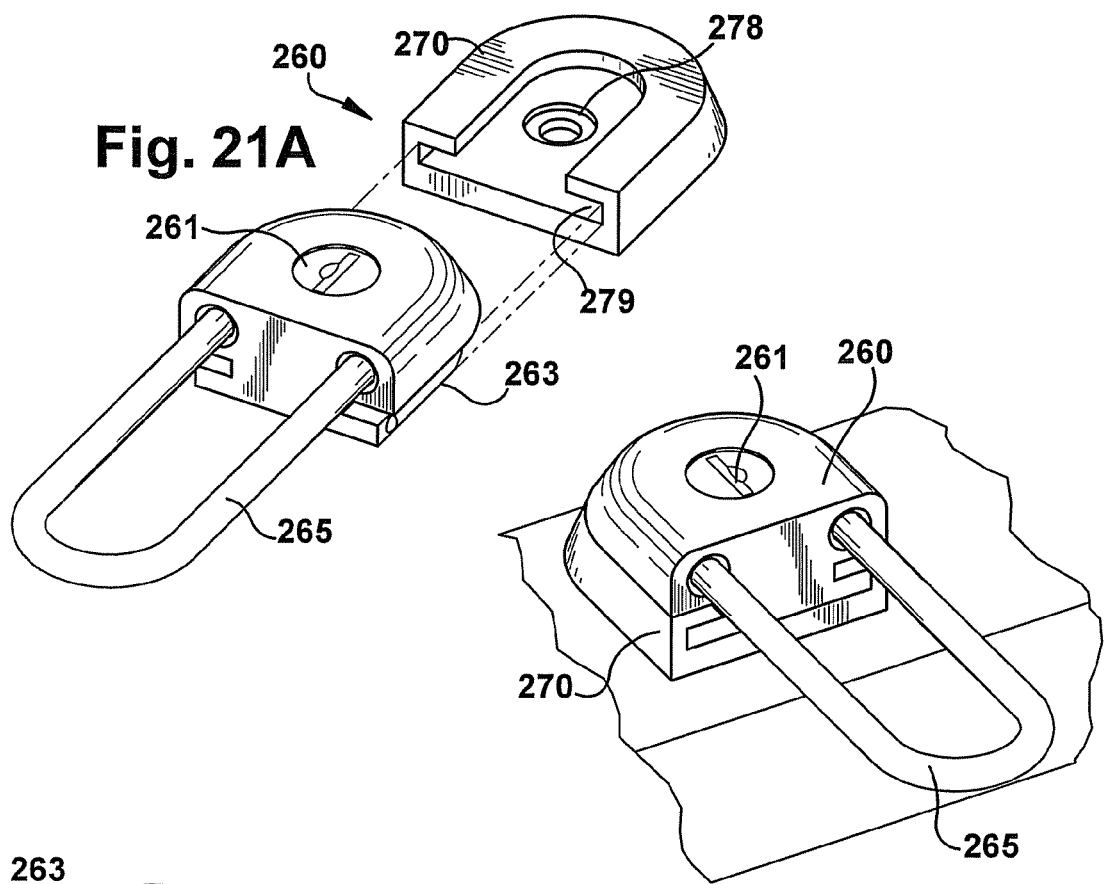
Fig. 21A
Fig. 21B
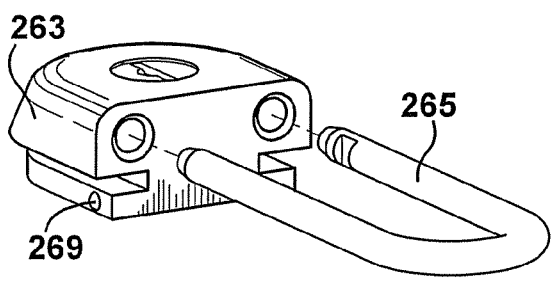
Fig. 21C
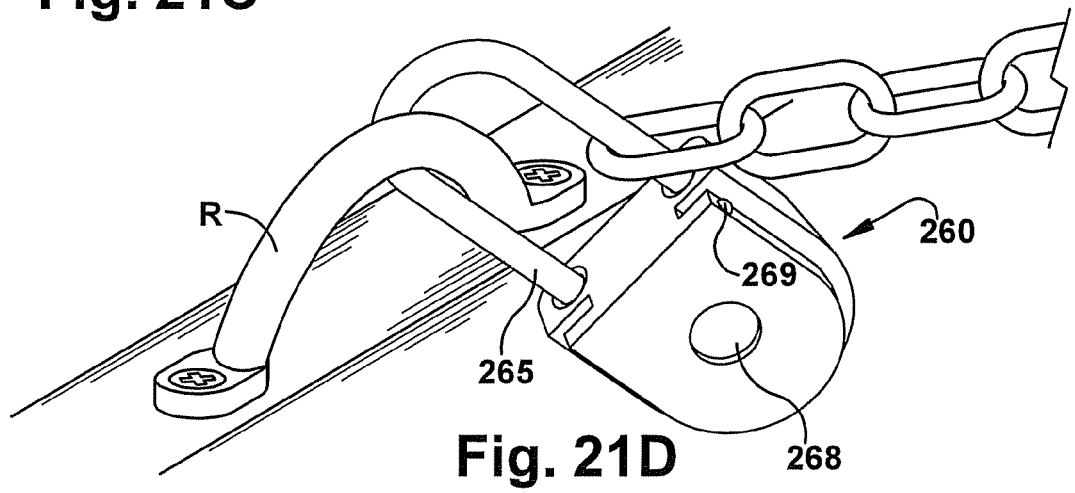
Fig. 21D

SECURE MOUNTING ARRANGEMENTS FOR A LOCK ASSEMBLY

CROSS REFERENCE TO RELATED APPLICATION

This application claims the benefit of U.S. Provisional Patent Application Ser. No. 60/941,871, entitled "SECURE MOUNTING ARRANGEMENTS FOR A LOCK ASSEMBLY" and filed Jun. 4, 2007, and U.S. Provisional Patent Application Ser. No. 60/982,525, entitled "SECURE MOUNTING ARRANGEMENTS FOR A LOCK ASSEMBLY" and filed Oct. 25, 2007, the entire contents of both of which are incorporated herein by reference, to the extent that they are not conflicting with the present application.

BACKGROUND

Tie downs and anchors are commonly used to secure an item to a vehicle or structure, for example, to prevent loss or to keep multiple items in an organized arrangement. While common cable ties, hooks, loops, or other such fasteners may be sufficient to hold an item, for example, in a truck bed to prevent loss of the item while the truck is being driven, in other applications, deterrence or prevention of theft may be desirable. Use of a separate lock such as a padlock, together with a vehicle or structure may limit the types, arrangements, and organization of items that may be secured to the vehicle or structure.

SUMMARY

The present application contemplates a secure mounting arrangement for a lock, configured to prevent removal of a mounted lock from the external structure to which the lock is mounted while the lock is in a locked condition. In one embodiment, a mountable lock includes a mounting member that secures the lock (either directly or indirectly) to an external structure. Access to, or manipulation of, the mounting member is restricted when the lock is in a locked condition, such that removal of the mounted lock from the external structure is prevented.

Accordingly, in one embodiment of the present application, a mountable lock includes a lock body and a retaining member. The lock body is configured to be secured to an external structure by at least one fastening member. The lock body includes a lock interface movable from a locking condition to an unlocking condition in response to proper user manipulation of the lock interface. The retaining member includes a first end receivable in a first opening of the lock body and lockingly engageable with the lock body when the lock interface is in the locking condition, the first end being disengageable from the first opening when the lock interface is in the unlocking condition. The at least one fastening member is accessible through a passageway in the lock body that is blocked when the retaining member is in locking engagement with the lock body, thereby preventing disassembly of the lock body from the external structure.

BRIEF DESCRIPTION OF THE DRAWINGS

Features and advantages of the invention will become apparent from the following detailed description made with reference to the drawings, wherein:

FIG. 21A illustrates a disassembled perspective view of a mountable lock and anchor type mounting member;

FIG. 21B illustrates an assembled perspective view of the mountable lock and mounting member of FIG. 21A;

FIG. 21C illustrates a perspective view of the lock of FIG. 21A, with the shackle disassembled from the lock body;

FIG. 21D illustrates a perspective view of the lock of FIG. 21A in use without the mounting member.

DETAILED DESCRIPTION

Figure 1:
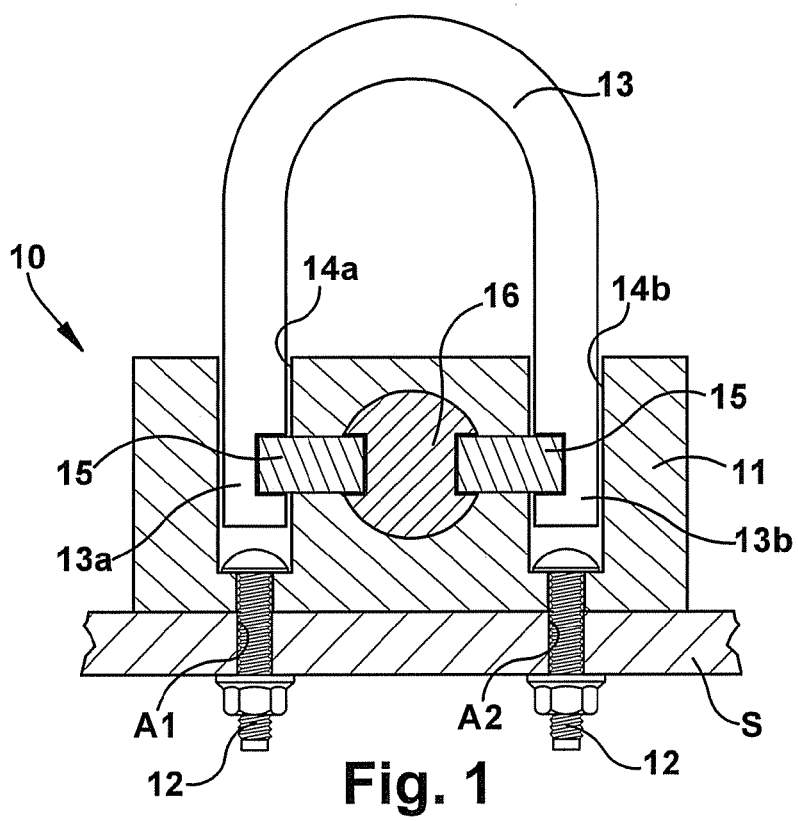
FIG. 1 illustrates a schematic cross-sectional view of a mountable lock.

This Detailed Description of the Invention merely describes embodiments of the invention and is not intended to limit the scope of the claims in any way. Indeed, the invention as described in the specification and claims is broader than and unlimited by the preferred embodiments, and the terms used have their full ordinary meaning.

The present application contemplates providing a lock, such as, for example, a padlock, U-bar lock, cable lock, or locking strap, that is mountable to a feature (such as, for example, a hole, recess, hook or ring) on an external structure (e.g., a wall, gate, or vehicle). The lock may provide a secure attachment point for an item to be secured to the structure, or, in the case of a locking cable or strap, a means for tying or holding down an item, for example, to prevent damage to or loss of an item in a vehicle when the vehicle is driven. A lock interface, which may be a key operated mechanism, combination locking mechanism, or other such arrangement, may prevent unauthorized access to or theft of the item being secured. In one embodiment, a lock is configured to be mounted to a mounting feature of a pickup truck bed, such as, for example, a stake pocket, flanged wall, or bolt hole in the truck bed, or a hook, loop, or "tie-down" ring affixed to the truck bed. While many of the drawings and descriptions of specific embodiments in the present application relate to mounting arrangements for securing a lock to the truck bed of a pickup truck, it will be apparent to one of ordinary skill in the art that the features and inventive aspects of the present application may be applied to mounting arrangements for securing many different types of devices, including lock assemblies, to many different types of structures.

In some circumstances, the security of the item being held by the lock may be compromised by removing or detaching the mounted lock from the structure to which the lock is attached. According to an inventive aspect of the present application, a lock configured to be mounted to a mounting feature of a structure or vehicle may be further configured to prevent manipulation of a mounting portion of the lock while the lock is in a locked condition. In such an embodiment, when the lock is accessed by an authorized key, combination, or other such method or device, the mounting portion may be manipulated to remove the lock from the vehicle or structure, for example, for assembly of the lock to another structure or another location of the vehicle, or for assembly of a different component (such as another lock) to the mounting feature. As one example, a lock having a lock body that lockably engages a shackle, cable, or other such retaining member may be mounted (directly or indirectly) to a mounting feature of a structure by a mounting member that may be accessed through an opening or passage that is blocked when the retaining member is engaged with the lock body (e.g., an opening in which the retaining member is lockably received). When the lock is in a locked condition, the retaining member blocks access to the mounting member, thereby preventing detachment of the lock from the mounting feature. When the lock is unlocked and the retaining member is disengaged from the lock body, the mounting member may be accessed through the opening or passage for detachment of the lock from the mounting feature.

FIG. 1 is a schematic cross-sectional view of a lock 10 having a lock body 11 mountable to a mounting feature (mounting holes A1, A2) of an external structure S by mounting members 12. The lock includes a shackle 13 (or other such retaining member) having first and second ends 13a, 13b that are receivable in corresponding shackle holes 14a, 14b for locking engagement with the lock body 11. While the shackle 13 of the illustrated schematic engages one or more retractable locking members 15 (e.g., ball bearings) for locking engagement with the lock body 11, other locking mechanisms may be utilized. The lock 10 includes a lock interface 16 (e.g., a key cylinder locking mechanism or a combination locking mechanism) operable (e.g., through use of an authorized key or combination code) to retract the locking members 15 to disengage the shackle 13 from the lock body 11. The mounting members 12 of the exemplary mounted lock 10 are only accessible through the shackle holes 14a, 14b in the lock body 11, thereby preventing disassembly of the lock body 11 from the external structure S when the shackle 13 is in locking engagement with the lock body 11. In the illustrated embodiment, the shackle 13 is fully disengaged or removed from the lock body 11 to access the mounting members 12 for disassembly of the lock body 11 from the external structure S. In another embodiment (not shown), a mountable lock may include a shackle (or other retaining member) having only one end disengageable from the lock body, with a single mounting member being accessible through the shackle opening of the disengageable end of the shackle.

Figures 2A, 2B:
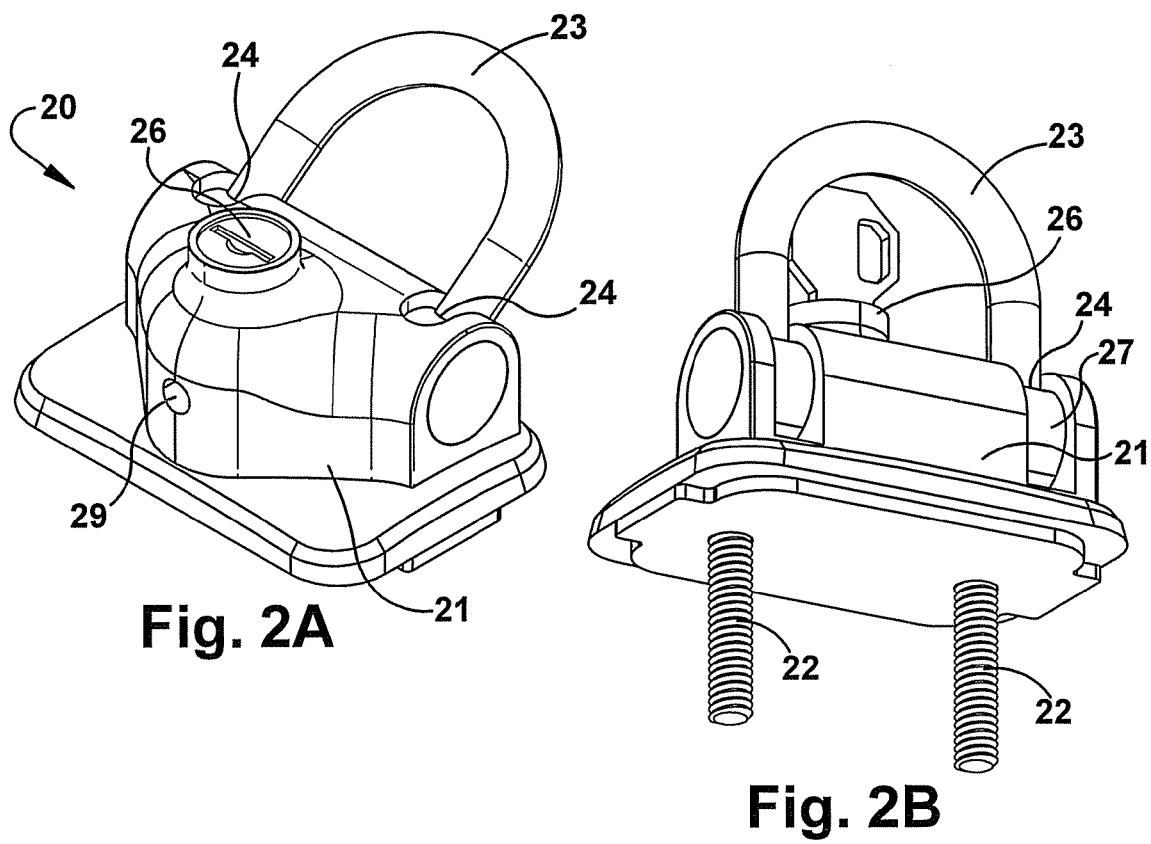
FIG. 2A illustrates a front perspective view of another mountable lock.
FIG. 2B illustrates a lower rear perspective view of the mountable lock of FIG. 2A.

FIGS. 2A and 2B illustrate an exemplary lock 20 configured to be mounted to a stake pocket of a truck bed. The lock 20 includes a key cylinder lock interface 26 operable to disengage a shackle 23 from the lock body 21 for withdrawal of the shackle 23 from corresponding shackle holes 24. When the shackle 23 is removed from the lock body 21, mounting members 22 (e.g., mounting screws) may be accessed through the shackle holes 24 to disassemble the mounting members 22 from corresponding mounting holes in the stake pocket (not shown), for detachment of the lock 20 from the stake pocket. The lock body 21 may include a pluggable port 29 to facilitate insertion of internal lock components into the lock body 21 such as, for example, one or more locking members (not shown).

Figure 3A:
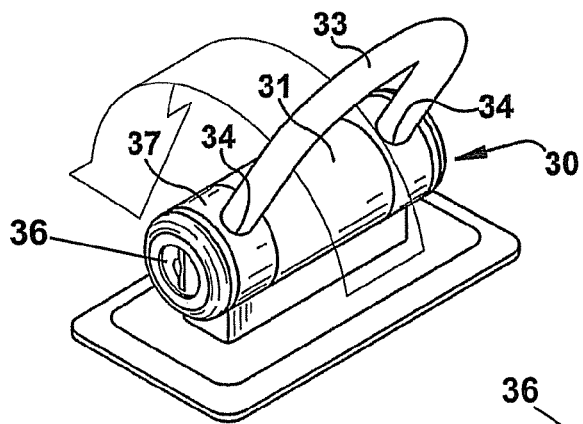
FIG. 3A illustrate a perspective view of another mountable lock.
Figure 3B:
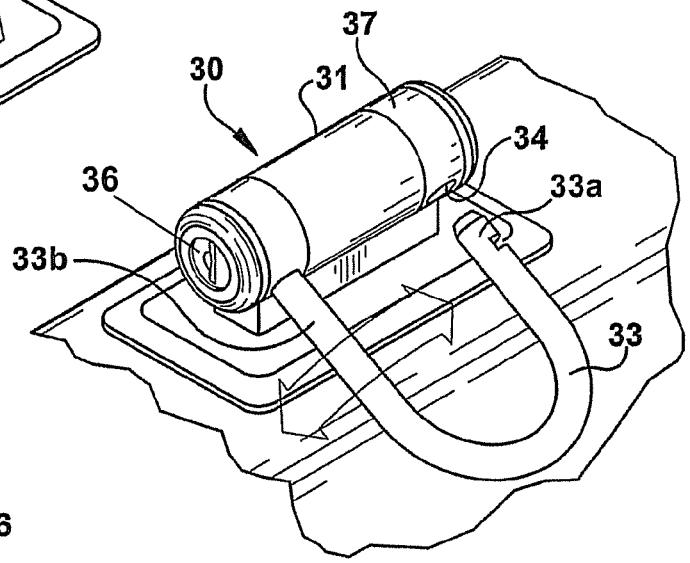
FIG. 3B illustrates a perspective view of the mountable lock of FIG. 3A, shown mounted to an external structure and in an unlocked condition.

As shown, the shackle holes 24 may be disposed in a pivot bar 27 that is rotatable with respect to a mounted portion of the lock body 21, thereby allowing the shackle 23 to pivot with respect to the mounted portion of the lock body 21. In the embodiment of FIGS. 2A and 2B, the shackle 23 is configured to pivot approximately 90 degrees. FIG. 3A illustrates another embodiment of a mountable lock 30, in which the shackle 33, when secured to the pivot bar 37, is permitted to pivot over a range of greater than 180 degrees with respect to the mounted portion of the lock body 31, for example, for improved adaptability. While the shackle 33 may be configured to be fully withdrawn from the shackle holes 34, the shackle 33 may alternatively have only a first end 33a disengageable from the lock body 31 (upon movement of the lock interface 36 to an unlocking condition), as shown in FIG. 3B, allowing the shackle 33 to pivot about the retained shackle end 33b.

Figure 4:
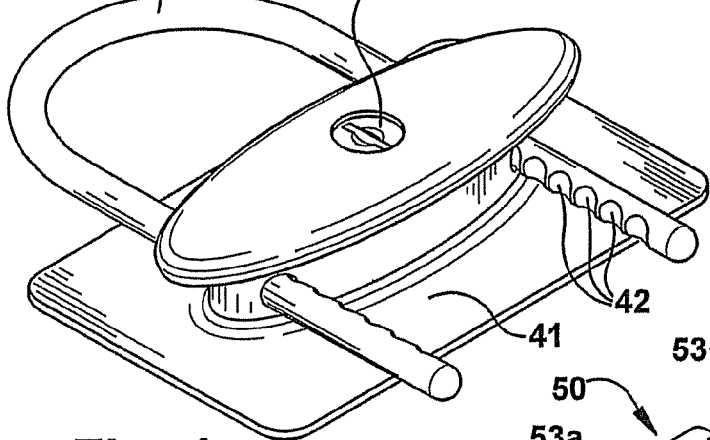
FIG. 4 illustrates a perspective view of still another mountable lock.

FIG. 4 illustrates another lock 40 configured to be mounted to a stake pocket of a truck bed. The lock includes a locking U-bar or shackle 43, which may be selectively locked in multiple axial positions (for example, by interlocking with any of a series of notches 42 in the shackle) to vary the size of the lock opening defined by the lock body 41 and U-bar 43. The lock body 41 may (but need not) be shaped to be used as a cleat, for example, to tie down an item stored in a truck bed. In one example, proper manipulation of the key cylinder lock interface 46 may allow a user to remove the key cylinder 46 from the lock body 41 to access a fastener (not shown) attaching the lock body 41 to the stake pocket or other such mounting feature.

Figure 5:
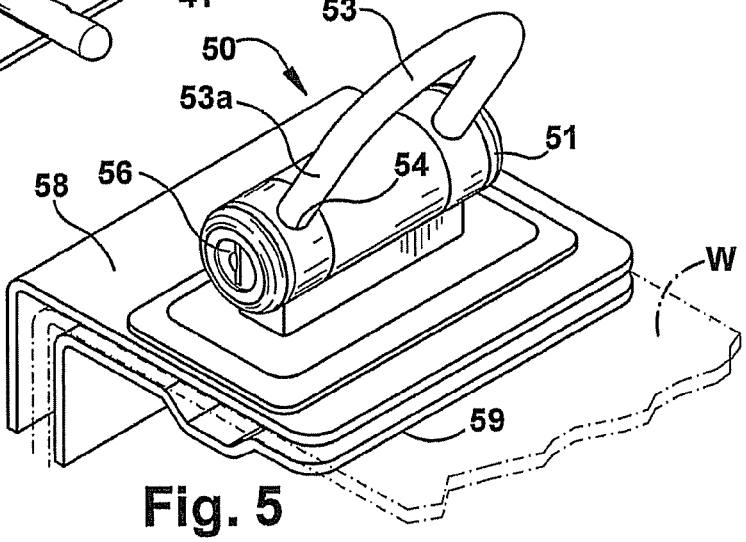
FIG. 5 illustrates a perspective view of a clamp mounted lock.

In another embodiment, a mountable lock may be configured to be mounted to a flanged wall, such as a truck bed overhang. FIG. 5 illustrates a lock 50 having a lock body 51 including a bracket portion 58 configured to be assembled with a corresponding mounting bracket 59 by one or more mounting members or fasteners (not shown) to clamp onto the flanged wall W. When at least a first end 53a of the shackle 53 is disengaged from the lock body 51 (upon movement of the lock interface 56 to an unlocking condition), the mounting member (or members) may be accessed through the shackle opening (or openings) 54, to loosen the brackets 58, 59 and detach the lock 50 from the flanged wall W.

Figure 6:
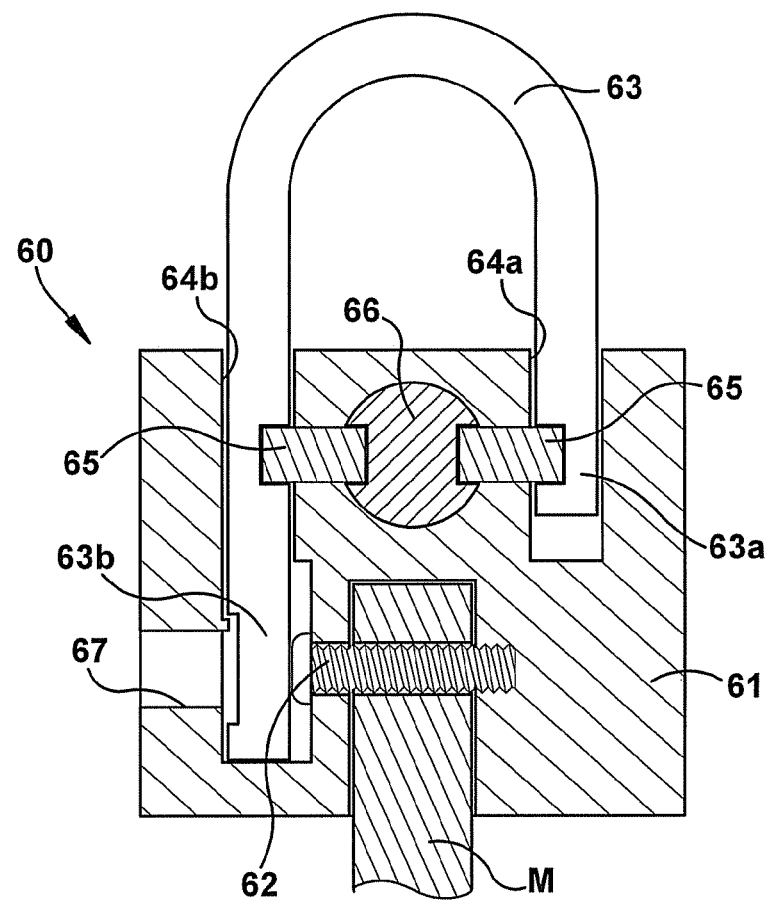
FIG. 6 illustrates a schematic cross-sectional view of a mountable lock.
Figure 7:
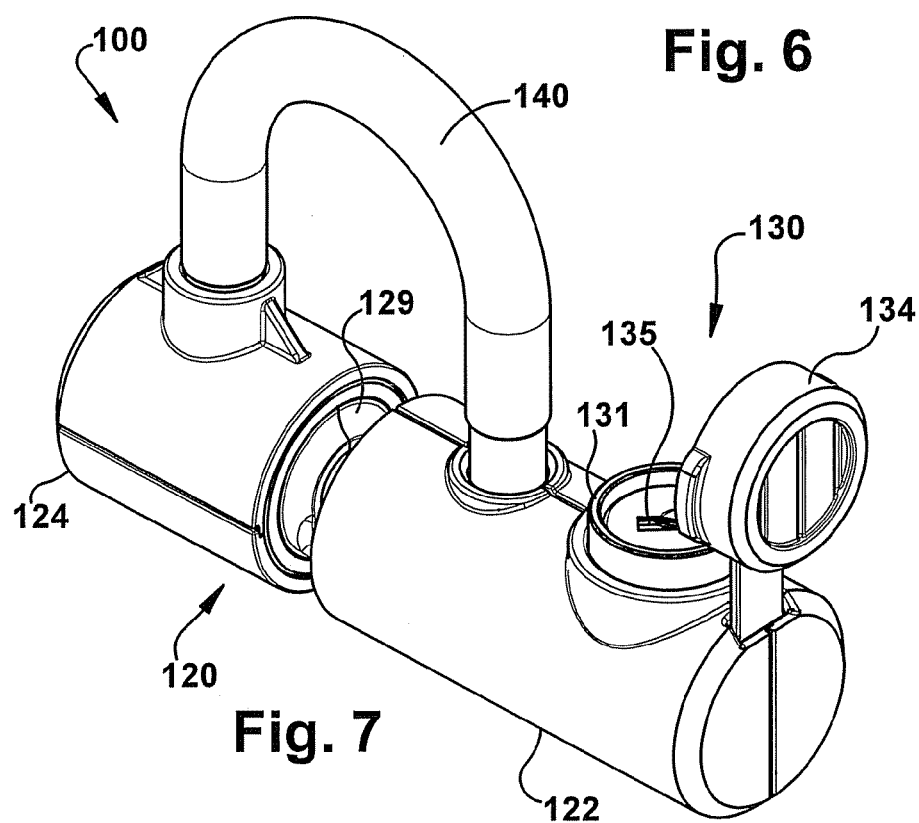
FIG. 7 illustrates a perspective view of a lock assembly configured to be affixed to an apertured member.
Figure 8:
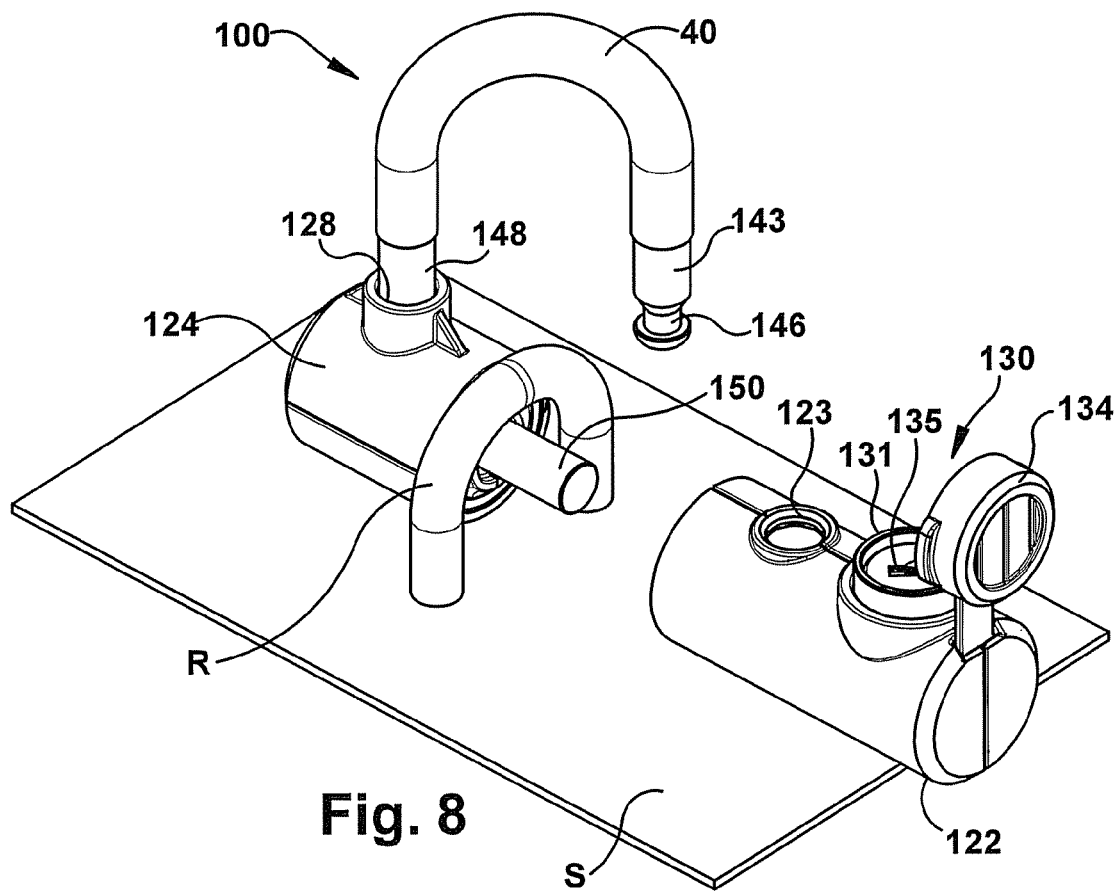
FIG. 8 illustrates a perspective view of the lock assembly of FIG. 7 in an unlocked condition with a first body member disassembled from a second body member for assembly with an apertured member.
Figure 9:
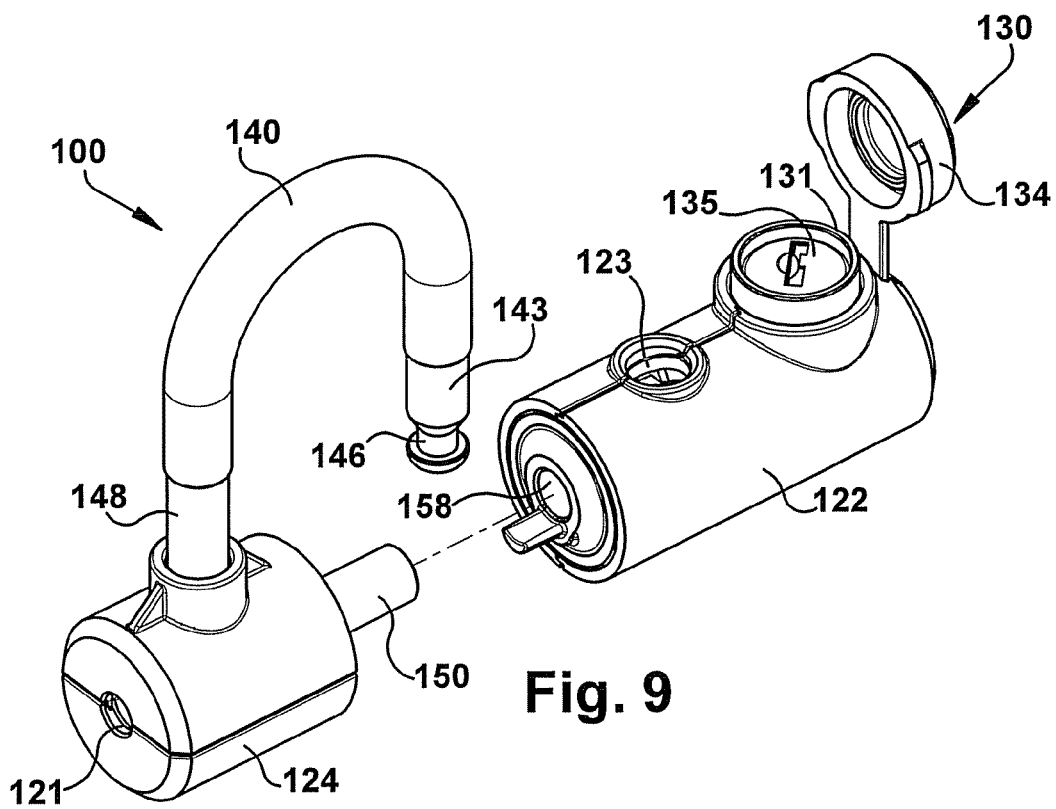
FIG. 9 illustrates another perspective view of the lock assembly of FIG. 7 in an unlocked condition with the first body member disassembled from the second body member.

According to another inventive aspect of the present application, a lock may include a lock body configured to be assembled with a hook, loop, ring, cut-out, or other such apertured member, such as, for example, a tie-down ring affixed to or assembled with a truck bed. FIG. 6 is a schematic cross-sectional view of a lock 60 having a lock body 61 mountable to an apertured member M by a mounting member 62. The lock 60 includes a shackle 63 (or other such retaining member) having first and second ends 63a, 63b that are receivable in corresponding shackle holes 64a, 64b to lockingly engage the lock body 61. While the shackle 63 of the illustrated schematic engages one or more retractable locking members 65 (e.g., ball bearings) for locking engagement with the lock body 61, other locking mechanisms may be utilized. The lock 60 includes a lock interface 66 (e.g., a key cylinder locking mechanism or a combination locking mechanism) operable (e.g., through use of an authorized key or combination code) to retract the locking members 65 to disengage the first end 63a of the shackle 63 from the lock body 61. The mounting member 62 of the mounted lock 60 is accessible through a passage 67 in the lock body 61, which is blocked when the shackle 63 is in locking engagement with the lock body 61, and is unobstructed when the first end 63a of the shackle 63 is disengaged from the lock body 61. As such, disassembly of the lock body 61 from the apertured member M is prevented when the shackle 63 is in locking engagement with the lock body 61. In the illustrated embodiment, only the first end 63a of the shackle 63 is disengageable from the lock body 61. In another embodiment, as shown in FIG. 1, a mountable lock may include a shackle that may be fully withdrawn or removed from the lock body.

Many other mechanisms and configurations may be utilized for providing secure attachment of a lock to a mounting feature of an external structure. According to another inventive aspect of the present application, a mountable lock may include a retaining member lockingly engageable with a lock body formed from two (or more) body members that are secured together by a mounting member to define an hole, groove, or other such recess configured to securely receive a mounting feature of an external structure, such as, for example, a ring, cut-out, or post. When the body members are secured to the mounting feature and the retaining member is in locking engagement with the lock body, access to the mounting member is blocked to prevent separation of the body members and removal of the lock from the mounting member.

In one embodiment, a lock body includes first and second body members and a retaining member (such as a shackle, U-bar, or cable) configured to lockingly engage one or both of the first and second body members. The first and second body members are configured to be attached to each other through, over, or around a mounting feature of an external structure, such that the first and second body members must be disassembled or separated from each other to remove the lock body from the external structure. As one example, a lock body may include first and second body members configured to be attached to each other through an opening in an apertured member that is affixed to a structure (such as, for example, a truck bed), to affix the lock body to the structure. In one such embodiment, a mounting member (such as a bolt, screw, or other such fastener) is extended through the opening of the apertured member to attach the first body member to the second body member, with the first and second body members being sized to prevent withdrawal through the opening. The lock may be configured such that a portion of the retaining member blocks access to the fastener when the locking assembly is in the locked condition (i.e., when the retaining member is in locking engagement with the lock body), thereby securely affixing the lock (and any item secured to the lock) to the apertured member. When the lock is in the unlocked condition (i.e., when the retaining member is separable from the lock body), the fastener is accessible and may be loosened to separate one or both of the first and second body members from the apertured member for removal of the lock from the structure.

FIGS. 7-10 illustrate an exemplary lock 100 configured to be affixed to an apertured member (such as, for example, the ring R of FIG. 8) connected to a structure S. The lock 100 includes a lock body 120 having first and second body members 122, 124. The first body member 122 includes a locking mechanism 130 configured to lockingly engage a first end 143 of a retaining member or shackle 140. A second end 148 of the shackle 140 is axially and pivotably movable within a second shackle opening 128 in the second body member 124. A retaining ring 149 (see FIG. 10) is assembled with the second end 148 of the shackle 140 to prevent withdrawal of the second end 148 from the second body member 124 when the locking mechanism 130 is unlocked.

Figure 10:
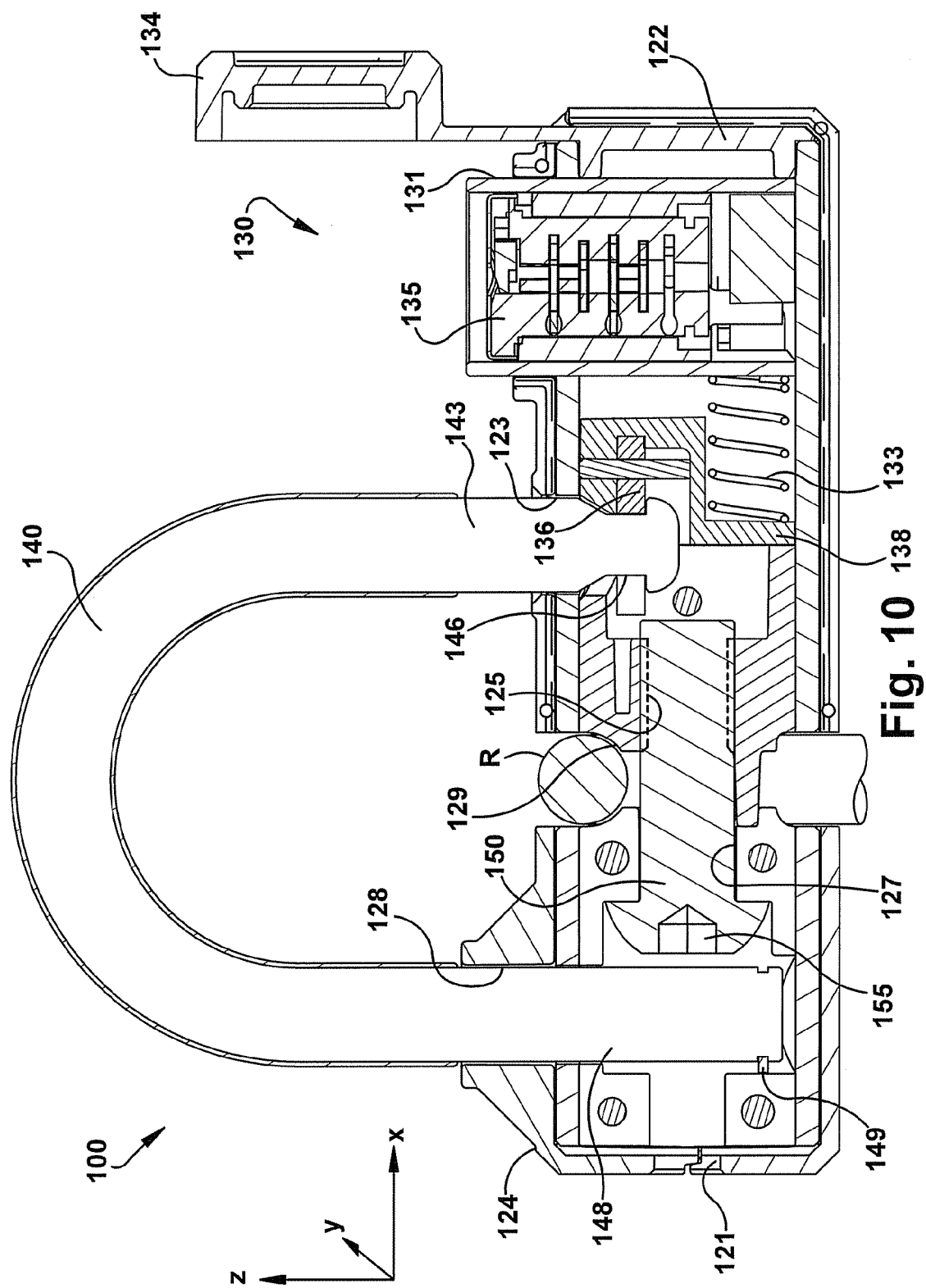
FIG. 10 illustrates a cross-sectional view of the lock assembly of FIG. 7.
Figure 11:
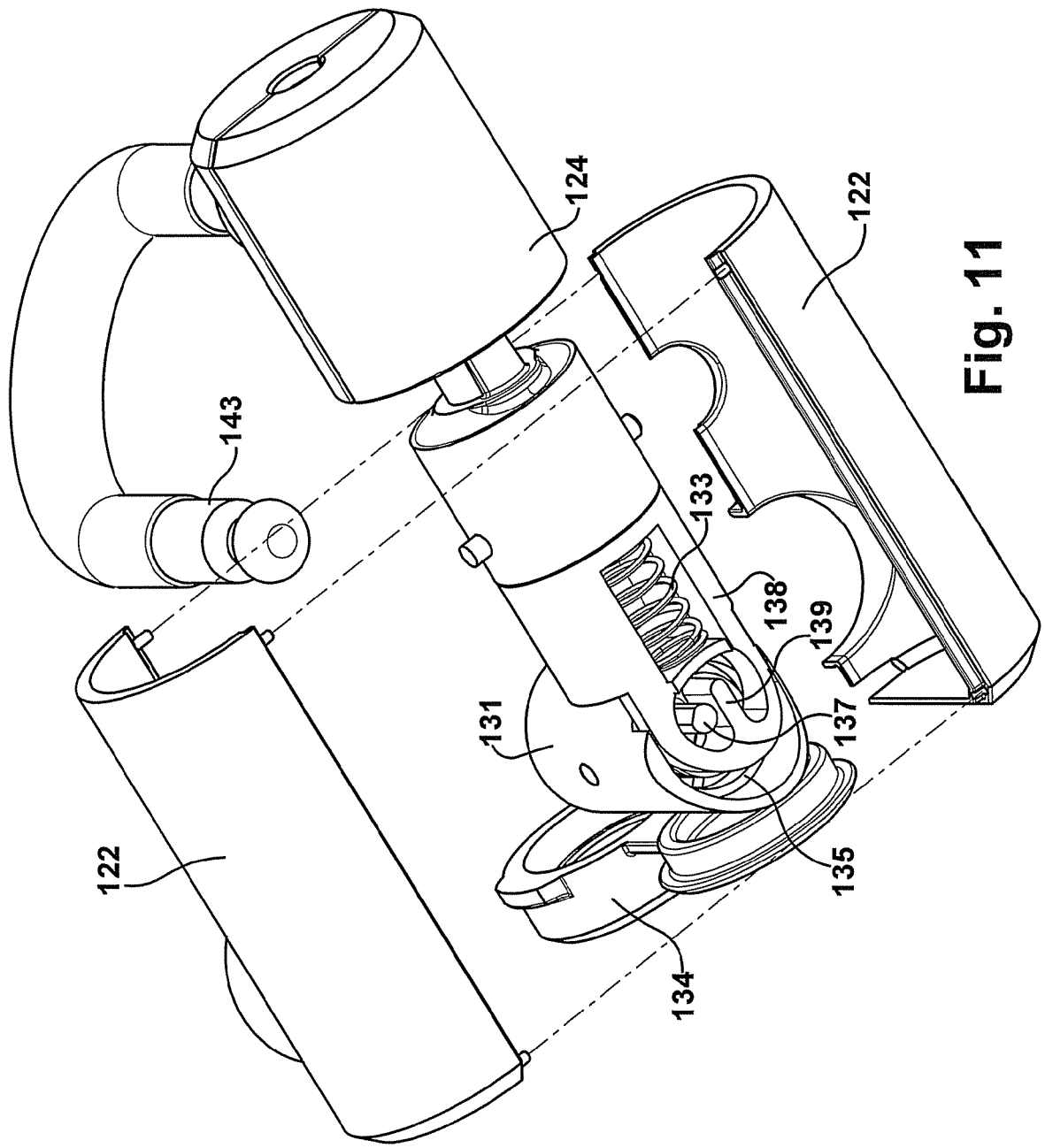
FIG. 11 illustrates a partial perspective view of the lock assembly of FIG. 7, with a housing portion of the first body member removed to illustrate additional features of the lock assembly.

While many different types of locking mechanisms or lock interfaces may be utilized, in the illustrated lock 100, as shown in the cross-sectional view of FIG. 10 and in the partial perspective view of FIG. 11, the exemplary lock interface 130 includes a locking key cylinder 135 (for example, a wafer or pin tumbler key cylinder, as known in the art) disposed in a tube extension 131. The key cylinder may be rotated using an authorized key to disengage a locking projection 136 from a corresponding groove or recess 146 in the first end 143 of the shackle 140, thereby allowing the first end 143 of the shackle 140 to be withdrawn from a first shackle opening 123 in the first body member 122. In the illustrated embodiment, a post 137 (see FIG. 11) extending from the key cylinder 135 revolves with the key cylinder to engage a camming surface 139 of a latch cylinder 138 to pull the latch cylinder against a spring 133, thereby pulling the locking projection 136 out of engagement with the shackle groove 146 to release the first end 143 of the shackle 140. The spring 133 returns the latch cylinder 138 to the locking condition when the post 137 is moved out of engagement with the camming surface 139. As shown, the lock 100 may be provided with a protective cover 134 that fits over the key cylinder 135, for example, to protect the key cylinder from foreign debris.

The first and second body members 122, 124 include aligned fastener openings 125, 127 configured to receive a mounting member 150 for attaching the first and second body members together. While many types of mounting members may be used, in the illustrated embodiment, a fastener 150 extending from the second body member 124 threadably engages a threaded portion of the fastener opening 125 of the first body member 122. When attached together, the first and second body members 122, 124 define an external contoured surface or recess (for example, a groove) 129 configured to accommodate the apertured member R. The recess 129 may be configured to closely receive the apertured member R, for example, to limit or prevent axial (along axis X), lateral (along axis Y) or radial (along axis Z) movement of the lock body 120 with respect to the apertured member R (see FIG.

10). In another embodiment (not shown), the body members may together define a hole sized to securely receive a post or other such mounting feature.

To tighten or loosen the fastener 150 for attachment or detachment of the first and second body members 122, 124, an access opening 121 may be provided in the second body member 124, through which a tool (not shown) may be inserted for manipulation of the fastener. To prevent disassembly of the lock body 120 when the lock 100 is in the locked condition, the access opening 121 may be positioned such that the second end 148 of the shackle 140 blocks access to the tool engagement portion 155 (e.g., bolt head) of the fastener 150 when the shackle 140 is in locking engagement with the lock body 120. When the lock interface 130 is in the unlocked condition, the shackle 140 may be extended to expose the tool engagement portion 155 of the fastener 150, thereby allowing the fastener 150 to be loosened and the lock body 120 to be disassembled from the apertured member R.

While the components of the lock 100 may be provided in any suitable material, in one exemplary embodiment, the body housings 122, 124, shackle 140, and tube extension 131 are provided in steel, which may (but need not) be hardened, and the latch cylinder 138 is provided in a zinc or aluminum casting. The shackle 140 and/or body housings 122, 124 may be provided with a plastic coating or covering.

While the lock body 120 may be provided in many different shapes, in the illustrated embodiment, the lock body 120 includes cylindrical or tubular housings and the recess 129 is circular in cross-section, allowing the lock 100 to be rotated with respect to the apertured member R, for example, to position the shackle 140 in a desired orientation. When used with larger apertured members R, which may result in a loose fit of the lock body 120 within the apertured member and/or disengagement of the apertured member R from the contoured surface 129, a base member or bezel may be assembled with the apertured member R to act as a spacer, holding the lock body contoured surface 129 in a more close fitting engagement with the apertured member R.

Figure 12:
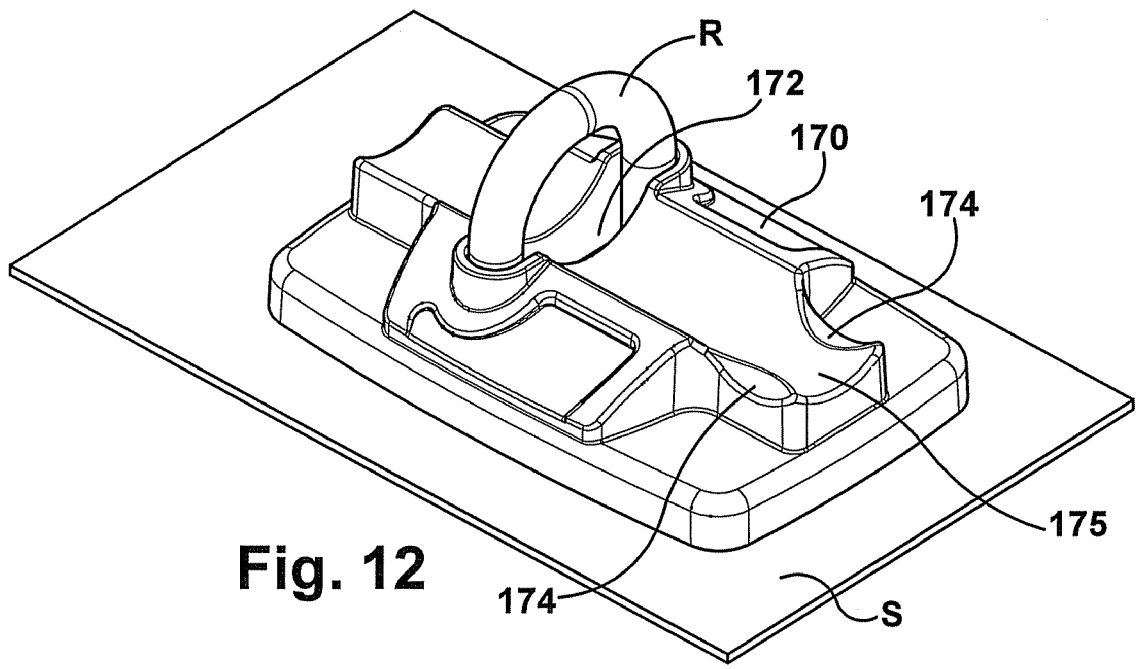
FIG. 12 illustrates a perspective view of a tie-down ring fitted with a base member.
Figure 12A:
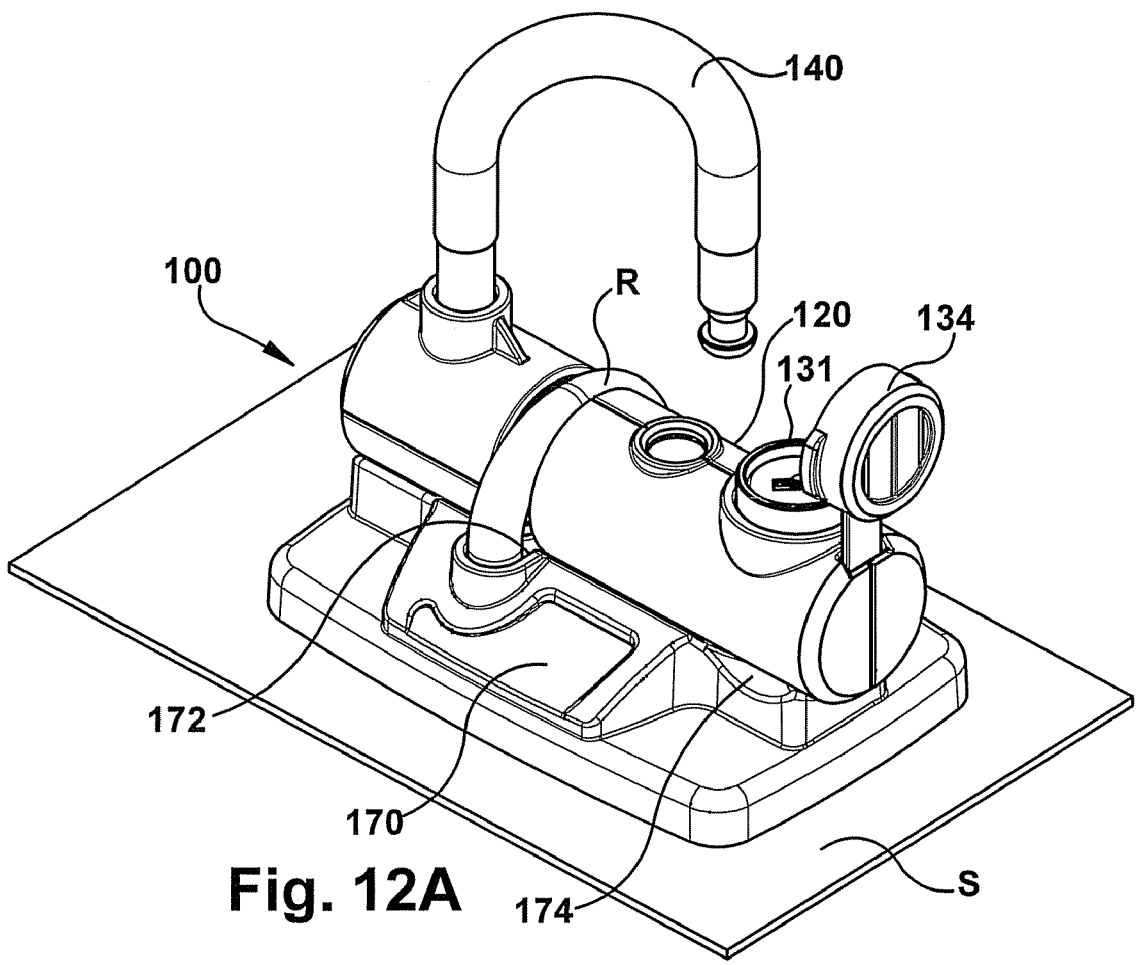
FIG. 12A illustrates a perspective view of a lock assembly secured to the tie-down ring and base member of FIG. 12.
Figure 13:
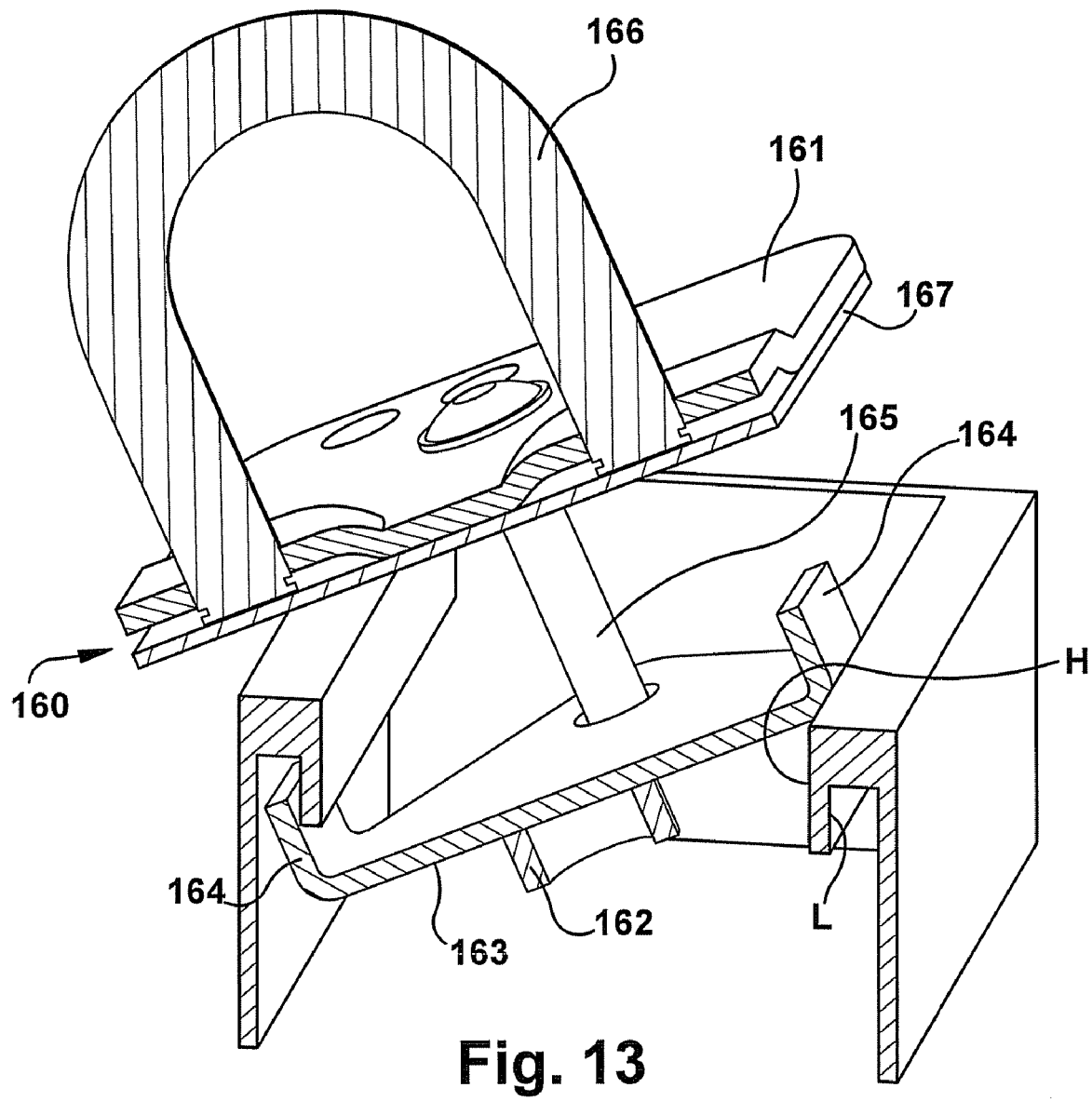
FIG. 13 illustrates a cross-sectional perspective view of a tie-down ring assembly configured to be affixed to a stake hole pocket.
Figure 14:
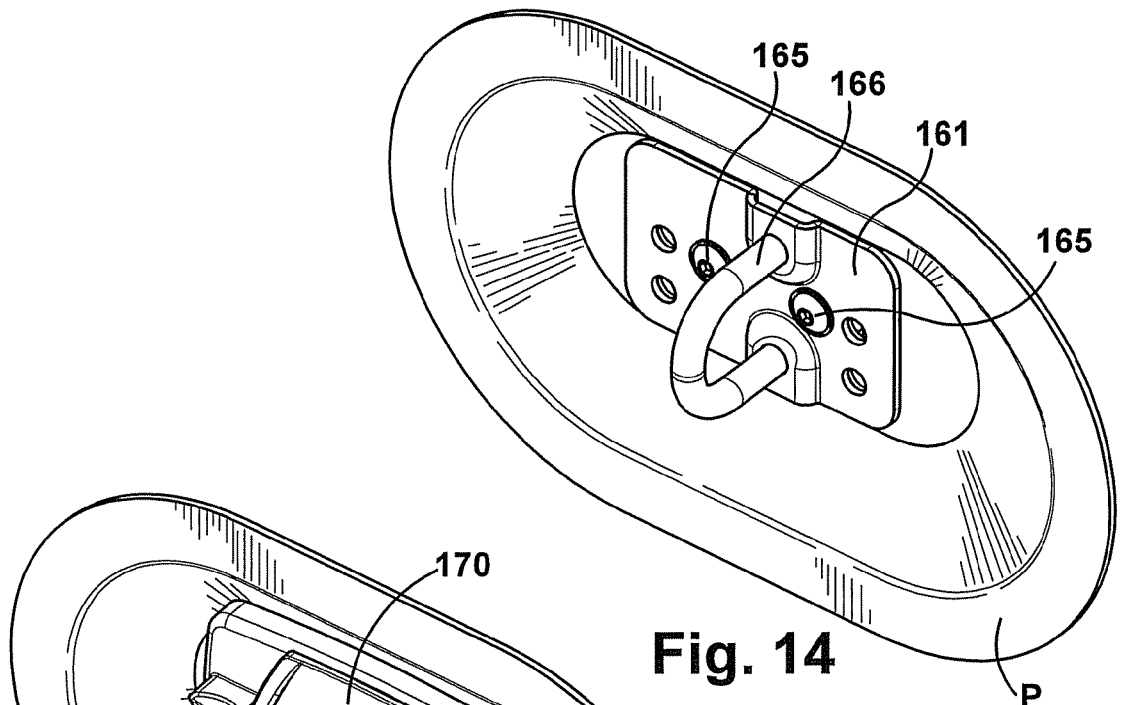
FIG. 14 illustrates a perspective view of the tie-down ring assembly of FIG. 13 assembled with a stake hole pocket.
Figure 15:
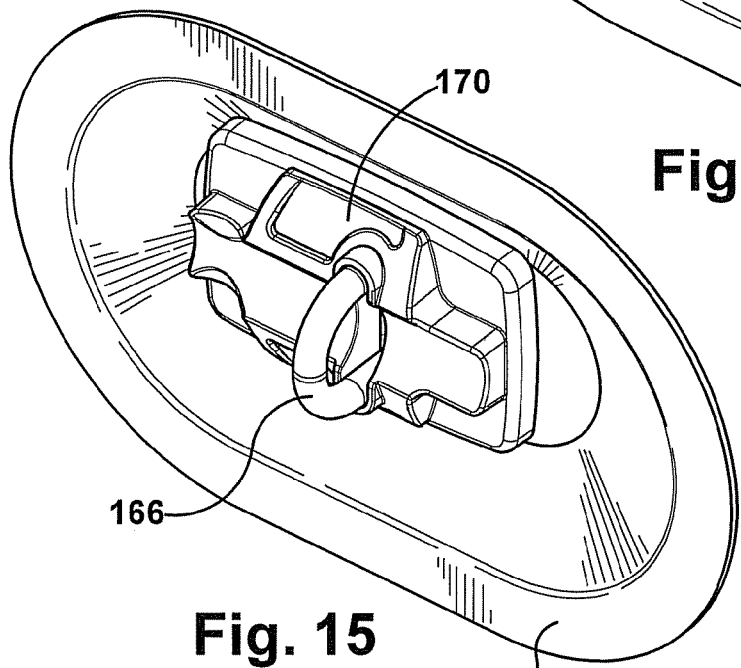
FIG. 15 illustrates a perspective view of the tie-down ring assembly of FIG. 7, shown fitted with a base member.
Figure 15A:
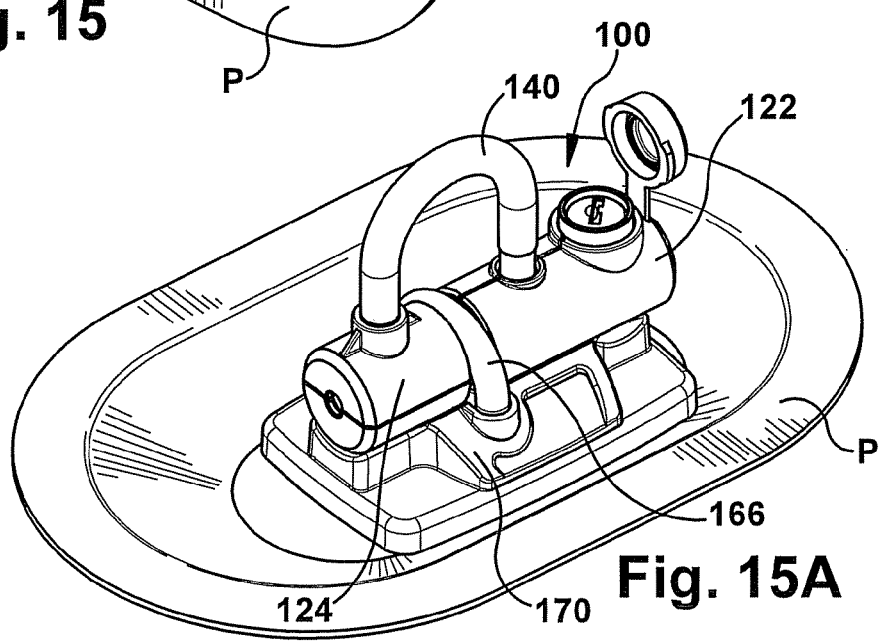
FIG. 15A illustrates a perspective view of a lock assembly secured to the tie-down ring and base member of FIG. 15.

FIGS. 12 and 12A illustrate an exemplary embodiment of an apertured member (for example, a tie-down ring) R fitted with a base member or bezel 170 sized to position a lock body 120, as shown in FIG. 12A, in close fitting engagement with the apertured member R. The cover member 170 includes a slot 172 through which the apertured member R is received, and may, but need not, include a contoured upper surface 175 shaped to correspond with the external surface of the lock body 120, for example, to facilitate rotation of the lock body 120. The cover member 170 may further include scalloped portions 174 positioned to receive the protruding key cylinder tube extension 131 to allow for further rotation of the lock body 120.

While a mounting feature (e.g., an apertured member) may be integral to or permanently affixed to a structure (for example, by welding) to prevent removal of the mounting feature and theft of an item secured to the mounting feature, in some applications, a mounting base including a mounting feature may be removably assembled to a structure (for example, a tie-down ring bolted onto a truck bed wall or anchored into a stake pocket). The mounting base may be affixed to the structure by one or more fastening members. To prevent unauthorized removal of the mounting base (and with it, the lock secured to the mounting base), access to the fastening members may be blocked by the mounted lock body. In another embodiment, a mounting base may include a cover member or bezel installed between the lock body and the fastening members, thereby blocking unauthorized access to the fasteners and removal of the mounting base.

FIGS. 13-15A illustrate a bolted tie-down ring mounting base 160 configured to be secured to an opening H in a structure (such as, for example, a stake hole pocket in a truck bed wall) by a mounting plate 161, threaded base plate 162, bracket 163 and threaded fasteners 165. As shown, the bracket 163 is cocked and lowered into the opening H to engage flanged ends 164 of the bracket 163 with a peripheral lower lip L of the opening H. The bolts 165 may then be tightened (i.e., threaded with the threaded base plate 162) to secure the ring 166 to the pocket P (see FIGS. 14 and 15). A gasket 167 (FIG. 13) may be provided between the mounting plate 161 and the pocket P to prevent marring of the pocket. A cover member 170 may be fitted over the mounting plate 161 and fasteners 165 and around the tie-down ring 166. By covering the fasteners 165, the cover member 170 prevents removal of the tie-down ring 166 while a lock 100 is assembled with the tie down ring 166 (see FIG. 15A). When the lock interface 130 is in the unlocked condition and the lock body 120 is disassembled from the tie down ring 166 (for example, by loosening the lock fastener 150 to separate the first and second body members 122, 124), the cover member 170 may be removed from the tie-down ring 166, and the fasteners 165 may be accessed to remove the tie-down ring 166 from the pocket P.

While the components of the tie-down ring assembly 160 may be provided in any suitable material, in one exemplary embodiment, the ring 166, fasteners 165, bracket 163, mounting plate 161, and base plate 162 are provided in steel, the cover member 170 is provided in injection molded plastic, and the gasket 167 is provided in an elastomer (for example, EPDM).

Many different types of mounting members may be used to secure a lock to an external structure, either directly or indirectly through use of a mounting base. Examples of mounting members include fasteners and retractable tabs or detents. In one embodiment (e.g., the embodiments of FIGS. 1-15A described above), a mounting member (such as a fastener) may not be accessed until a lock secured to the external structure or mounting base is unlocked. In another embodiment, some type of manipulation of a lock interface may actuate (or permit actuation of) a mounting member to release the lock from the external structure. While the lock interface may be configured to actuate (or permit actuation of) the mounting member upon movement to an unlocking condition, in another embodiment, a lock interface may be configured such that a second operation (different from movement to the unlocking condition) actuates the mounting member. This allows the lock to be unlocked while remaining secured to the external structure.

Figure 16:
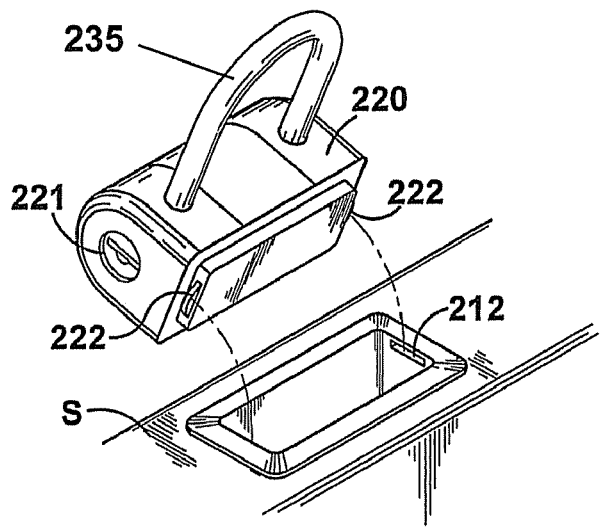
FIG. 16 illustrates a disassembled perspective view of a lock configured to be secured to recessed slots in an external structure.
Figure 17:
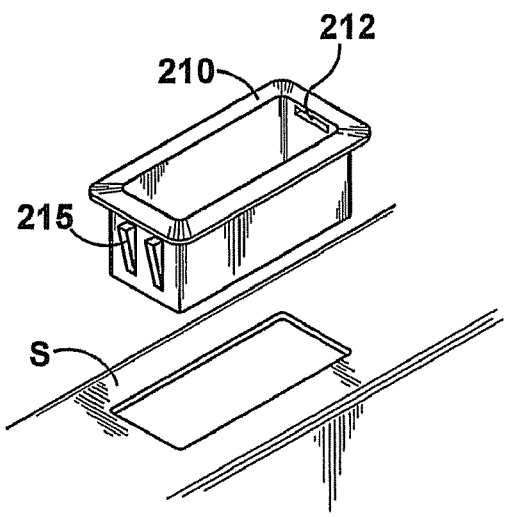
FIG. 17 illustrates a perspective view of mounting base for mounting the lock of FIG. 16 to an external structure.

As one example, a combination lock may have a first combination for unlocking the lock and a second combination for releasing the lock from the external structure, for example, by disengaging the mounting member (e.g., a locking tab or detent) from an interlocking feature of the external structure or mounting base. As another example, and as shown in FIG. 16, a mountable lock 220 may have a key cylinder mechanism 221 configured to unlock the lock when an inserted key is rotated to a first orientation (for example, 90° clockwise relative to a locked orientation), and configured to release the lock 220 from a mounting feature when the key is rotated to a second orientation (for example, 180° clockwise or 90° counterclockwise, relative to a locked orientation). In the illustrated embodiment, rotating the key to the second orientation retracts tabs 222 from corresponding recessed slots 212 in the external structure S to release the lock 220 from the mounting feature. While the mounting feature (recessed slots 212) may be provided on the external structure S to which the lock 220 is mounted, such as a stake pocket in a truck bed, in another embodiment (see FIG. 17), a mounting base 210 may be provided with corresponding slots 212 for engaging the retractable tabs 222. In the illustrated embodiment, the mounting base 210 includes pivotable locking walls 215 that may be screwed outward to secure the mounting base 210 within the stake pocket (not shown). Other configurations for securing a mounting base to an external structure may also be used.

Figure 18:
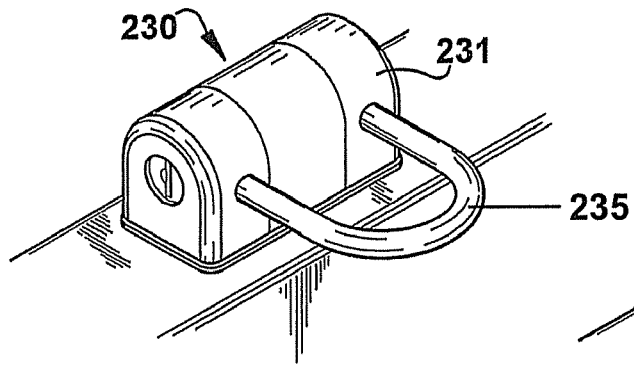
FIG. 18 illustrates a perspective view of a U-bar type lock secured to the mounting base of FIG. 17.
Figure 20:
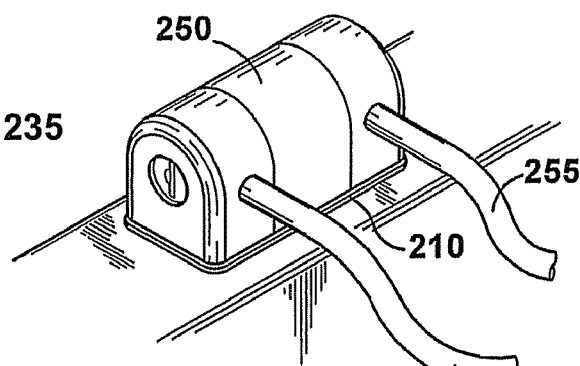
FIG. 20 illustrates a perspective view of a flexible cable lock secured to the mounting base of FIG. 17.
Figure 19:
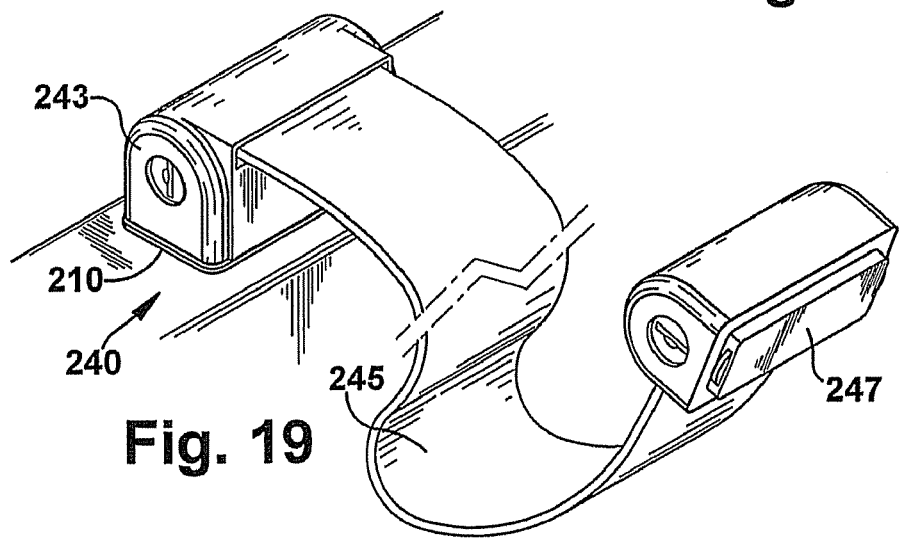
FIG. 19 illustrates a perspective view of retractable strap type lock for mounting to the mounting base of FIG. 17.

Locks having many different types of retaining members may be configured to be selectively and interchangeably attached to a mounting base (or directly to the external structure) for securing an item or items to the external structure. FIG. 18 illustrates a lock 230 having a rigid locking U-bar 235. FIG. 19 illustrates a lock 240 having a retractable strap 245 extendable from a housing 243 attached to a first mounting adapter 210 and having a latch portion 247 lockably attachable to a second mounting adapter (not shown). FIG. 20 illustrates a lock 250 having a flexible locking cable 255.

As another type of mounting arrangement, as shown in FIGS. 21A-21D, a mounting member or anchor 270 may be secured to a mounting feature of a truck bed, for example, to a stake pocket, or to a truck bed overhang. The anchor 270 may be configured to securely receive a lock, such as, for example, the padlock 260 of FIGS. 21A-21D. In one such embodiment, the lock 260 may be configured to be lockably secured to the anchor 270 when in a locked condition. When the lock interface 261 is unlocked (or otherwise manipulated with an authorized key or code), the lock may be disengaged from the anchor 270. As one example, in the illustrated embodiment of FIGS. 21A-21D, the anchor 270 includes a counterbore or recess 278 sized to receive a projection 268 (see FIG. 21C) of the padlock 260 when the padlock is in a locked condition, thereby preventing the padlock 260 from sliding out of engagement with the anchor 270. When the lock interface 261 is unlocked or otherwise manipulated by an authorized key or code (in the case of a combination lock), the projection 268 is retracted into the padlock body 263, thereby allowing the lock body 263 to slide out of the anchor 270 for removal of the lock 260. The lock body may further include a detent, nub, or catch 269 that engages anchor slot 279, requiring pulling force by a user to remove the unlocked padlock 260 from the anchor 270, to prevent the padlock 260 from inadvertently sliding out of the anchor 270 when the padlock 260 is unlocked. As shown in FIG. 21D, the padlock 260 may also be used to secure items (to a ring R or other apertured member) when removed from the anchor 270, providing additional versatility for the lock arrangement. While the anchor 270 may be mounted to an external structure using many different configurations, in one embodiment, the anchor 270 may be secured to an external structure (e.g., a truck bed stake pocket) by a fastener (not shown) that is covered by the lock body 263 when the lock 260 is secured to the anchor 270, thereby preventing unauthorized removal of the anchor 270 and the mounted lock 260 from the external structure.

Figure 22:
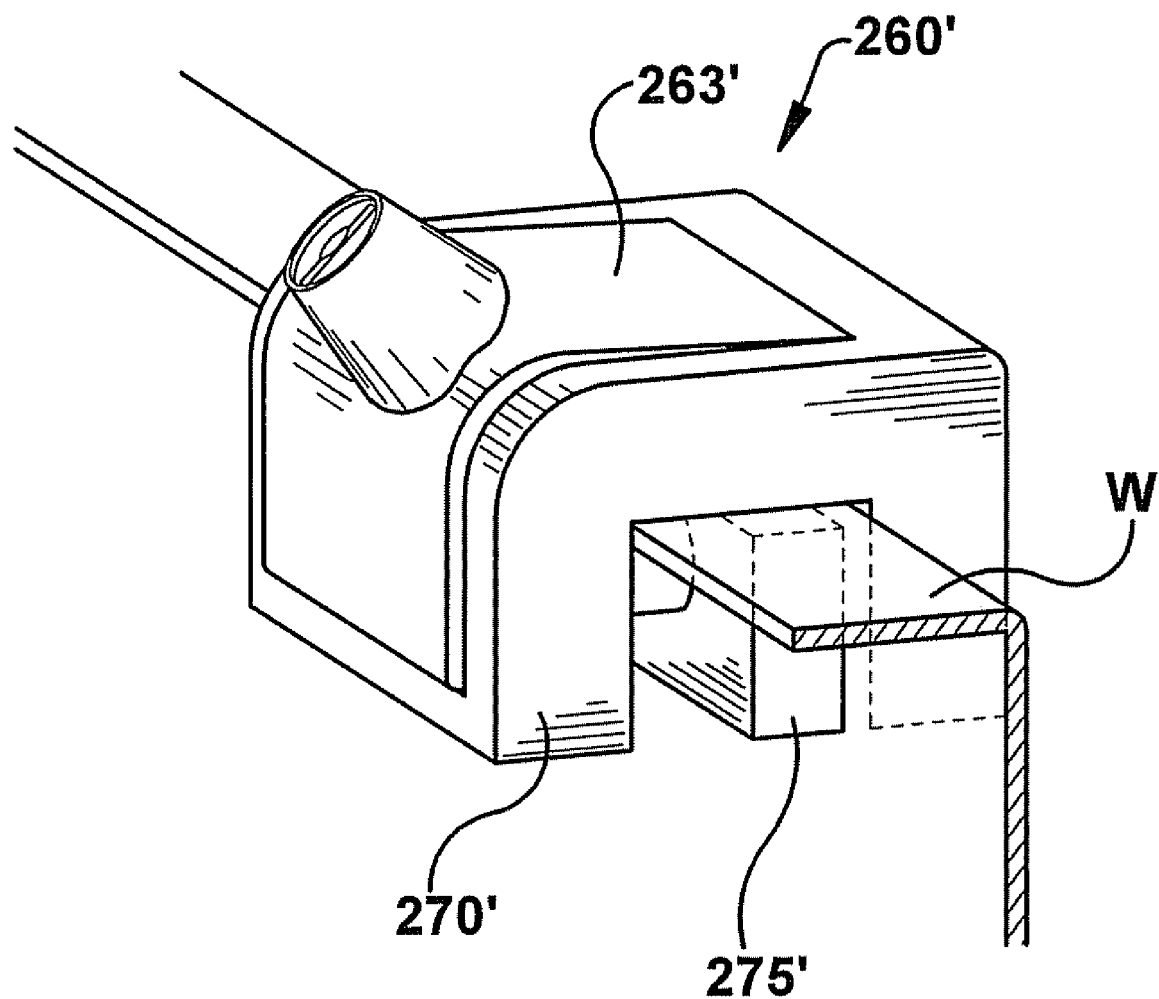
FIG. 22 illustrates a perspective view of a mountable lock secured to a clamp mounted mounting member.

In the lock of FIG. 22, the anchor 270' is clamped to a flanged wall W (e.g., a truck bed overhang) by a clamping member 275' that is tightened and loosened by a fastening member (not shown) that is covered by the lock body 263' when the lock 260' is secured to the anchor 270', thereby preventing unauthorized removal of the anchor 270' and the lock 260' from the flanged wall.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

I claim:

1. A mountable lock comprising:
   a lock body including first and second body members secured together by a body fastener, the first and second body members together defining a recess configured to securely receive a body retaining portion of an external structure;
   a lock interface disposed in the first body member and movable from a locking condition to an unlocking condition in response to proper manipulation of the lock interface; and
   a retaining member having a first end portion lockingly engageable with the first body member when the lock interface is in the locking condition, the first end portion being disengageable from the first body member when the lock interface is in the unlocking condition;
   wherein the body fastener is accessible through a passageway in the second body member that is blocked when the retaining member is lockingly engaged with the first body member, thereby preventing disassembly of the first and second body members from the external structure.

2. The mountable lock of claim 1, wherein the first and second body members together define a circumferential groove.

3. The mountable lock of claim 1, wherein the lock body is configured to be secured to a pocket of an external structure.

4. The mountable lock of claim 1, wherein the lock body is configured to be clamped to a laterally extending flange of an external structure.

5. The mountable lock of claim 1, further comprising a locking member that is retractable for disengagement of the retaining member from the first body member.

6. The mountable lock of claim 5, wherein the first end portion of the retaining member is received in a first opening of the first body member and the lock interface comprises a key cylinder that is selectively rotatable to disengage the locking member from the retaining member.

7. The mountable lock of claim 6, further comprising a post extending from the key cylinder, the post forcing the locking member out of engagement with the first end portion of the retaining member when the key cylinder is rotated to the unlocking condition.

8. The mountable lock of claim 7, wherein the post extends through a camming portion of the locking member.

9. The mountable lock of claim 6, wherein the key cylinder and first opening are disposed on an upper surface of the lock body.

10. The mountable lock of claim 6, wherein the locking member is spring biased away from the key cylinder in a direction perpendicular to the key cylinder.

11. The mountable lock of claim 1, wherein the retaining member comprises a U-shaped shackle.

12. The mountable lock of claim 1, wherein the first end portion of the retaining member is received in a first opening in the first body member, and a second end portion of the retaining member is slidably retained within a second opening disposed in the second body member.

13. The mountable lock of claim 12, wherein the second end portion of the retaining member blocks access to the body fastener when the first end portion is engaged with the first body member, and permits access to the body fastener when the first end portion is disengaged from the first opening.

14. In combination, a mountable lock and a lock-retaining tie-down ring, the mountable lock comprising:
   a lock body including first and second body members having adjoining ends that are secured together to define an annular recess around an outer perimeter of the lock body, the annular recess being sized to closely receive the tie-down ring thereabout, such that the lock body is securely retained by the tie-down ring when the first and second body members are secured together on the tie-down ring;
   a lock interface disposed in the lock body and movable from a locking condition to an unlocking condition in response to proper manipulation of the lock interface; and
   a retaining member having a first end portion lockingly engageable with the lock body when the lock interface is in the locking condition, the first end portion being disengageable from the lock body when the lock interface is in the unlocking condition;
   wherein the first and second body members are secured together by a body fastener that is only accessible when the first end portion of the retaining member is disengaged from the lock body.

15. The combination of claim 14, wherein the body fastener is accessible through a passageway in the lock body, the passageway being blocked when the retaining member is in locking engagement with the lock body.

16. The combination of claim 15, wherein the passageway extends from an access opening in an end face of the second body member opposite the adjoining end of the second body member.

17. The combination of claim 14, wherein the lock interface is disposed in the first body member, and the body fastener is retained with the second body member when the first body member is disassembled from the second body member.

18. The combination of claim 14, wherein the first end portion of the retaining member is received in a first opening in the first body member, and a second end portion of the retaining member is slidably retained within a second opening disposed in the second body member.

* * * * *